Patented Nov. 30, 1943

2,335,323

UNITED STATES PATENT OFFICE 2,335,323

PEST CONTROL

Wendell H. Tisdale, Wilmington, Del., assignor to E. I. du Pont de Nemours & Company, Wilmington, Del., a corporation of Delaware No Drawing. Application March 3, 1942, Serial No. 433,184

18 Claims. (Cl. 47—58)

This invention relates to the control of nematodes or eelworms which infest soil and attack subterranean parts of plants and is particularly directed to compositions and to methods in which control is effected by incorporating in the infected soil a compound selected from the class consisting of phenyl and furyl nitroethylenes.

Nematodes or eelworms are tiny roundworms which infest soil and attack the subterranean parts of a wide variety of plants. Four to five hundred different kinds of plants are known to be attacked in the United States, among which tomatoes, cucumbers and cyclamen are peculiarly susceptible. Nematodes are destructive in greenhouses throughout the United States and outside in the more temperate regions. Plants infested by nematodes will present a weakened, sick appearance without visible injury to the stem or any parts of the plant above ground. Examination of the roots shows numerous knots or galls, or other manifestations according to the nature of the plant or the type of nematode involved. The damage caused by these pests is widespread, and control measures are extensive and inadequate.

The most common method for the control of nematodes has been the sterilization of the soil by heat and this method, because of the expense involved and the difficulty of its application is of limited use, being almost wholly confined to greenhouses. Chemical controls likewise are insufficient. Chloropicrin, one of the most successful heretofore employed, is relatively expensive and difficult to apply. Chloropicrin is a highly volatile liquid; it is injected into the soil in holes spaced about 15 inches apart. To cover an acre this way is an onerous and expensive operation. Then, too, the soil must be covered to prevent the escape of the chloropicrin vapors, if the treatment is to be effective. This is done in the art either by watering the soil immediately after the application of the chloropicrin or by covering it with craft paper having its edge treated with a special adhesive so that an effective seal can be obtained. There is a need therefore for a material which may be incorporated in the soil more easily, that is effective without extensive surface treatment of the soil, and one which is cheaper and more effective than chloropicrin. The various materials previously suggested, such as carbon disulfide, formaldehyde, sulfur, cyanamide and the like, fall short in these respects.

I have now found that the disadvantages of the prior art methods can be avoided by treating the soil infected with nematodes to incorporate therein a compound selected from the class consisting of 1-alpha-furyl-nitroethylene and 1-phenyl-2-nitroethylene. I am able by incorporating a relatively small amount of these agents in the soil adequately to control the disease with greater economy and with less danger of injury to seedlings than with the known chemical control. By incorporating these agents into infested soil in suitable quantities plants may be set out after a few weeks' weathering without injury. It appears that the growth of the plant is actually accelerated and that after two or three weeks' weathering the agents actually are phytonutrient rather than phytocidal. Thus, by the use of the methods and compositions of my invention growth of the plants is greatly stimulated, not only by virtue of their being freed from the dwarfing effect of the nematodes, which would otherwise infest the roots of the plants, but by reason of an actual enrichment of the soil.

The compounds utilized in effecting chemical control of nematodes according to my invention may be prepared from relatively cheap and available raw materials such as furfural, benzaldehyde and nitromethane, according to the general reaction $RCHO + NO_2CH_3 \rightarrow RHC=CHNO_2$. R in these formulas is a monocyclic unsubstituted aromatic ring of the benzene and furane series and has the common characteristics of being derived from the wholly aromatic aldehydes, benzaldehyde, and furfural.

The data given in the following table illustrate the comparative effectiveness of the materials of this invention with reference to chloropicrin, a widely used and recommended control for nematodes. The table also includes a number of highly effective insecticides and fungicides which are either wholly ineffective or wholly unsuited for the control of nematodes. In obtaining these data the test compound was thoroughly incorporated into soil heavily infested with the root-knot nematode (*Heterodera marioni*). The treated soil was placed in five 5" pots in each of which were included roots of severely infected tomato plants. To obtain uniformity of distribution of the test compound it was first mixed with 50 grams of sand per pot, that is, a total of 250 grams for the five pots. Each pot contained approximately 5100 grams, i. e., 5050 grams soil and 50 grams sand. The amount of the test compound added to the sand was varied to give the concentration indicated in the table on a weight basis.

Table

| Compound | Parts per million | Nematode control, per cent | Plant injury |
|---|---|---|---|
| 1-(alpha-furyl)-2-nitroethylene | 440 | 100 | Severe. |
|  | 220 | 100 | Very slight. |
|  | 110 | 85+ | None. |
| 1-phenyl-2-nitroethylene | 880 | 100 | Severe. |
|  | 440 | 100 | None. |
|  | 220 | 100 | Do. |
|  | 110 | Partial | Do. |
| Chloropicrin | 440 | do | Stunted. |
|  | 880 | 100 | Severe. |
| Phenothiazine | 440 | 98 | Do. |
|  | 220 | None | Do. |
| Diphenylamine | 880 | do | None. |
| Phthalonitrile | 880 | do | Severe. |
| Phenanthrene | 880 | do | Do. |
| Lauryl pyridinium bromide | 880 | do | Do. |
| Sodium dimethyl dithiocarbamate | 880 | do | Do. |
| 2,4-dinitrophenol | 880 | Some | Do. |
| 2,5-dinitro-orthocresol | 880 | None | Do.[1] |
| Lauryl thiocyanate | 880 | Partial | Stunted. |

[1] Killed seedlings planted two months after treatment.

The data given in the foregoing table illustrate the outstanding merit of furyl nitroethylene and phenyl nitroethylene for the control of nematode. It shows that these two materials are more effective than that commonly used and recommended material chloropicrin. It also shows the high specificity of the control measures required to control the pest and demonstrates the unsuitability of known insecticides and fungicides, all of which are consistent with the peculiarities of the subterranean environment of the organisms and the high sensitivity of seedlings to various chemicals incorporated into soil together with the fact that some chemicals weather to nonphytocidal concentrations whereas others do not. Peculiar advantage of the furyl and phenyl nitroethylenes appears in the weathering of these compounds to a condition in which they are phytonutrient and and actually yield up their nitrogen to the plant and thereby stimulate growth and development of the seedlings.

Compositions suitable for incorporating these nitroethylenes into infested soil are made by grinding the product to a finely divided, free-flowing powder together with a suitable solid diluent. The phenyl and furyl nitroethylenes are solid crystalline products which may be ground to a powder either alone or in admixture with a suitable diluent. The powdered nitroethylene is mixed with sufficient diluent so that it may be applied effectively with a suitable mechanical distributor, which may be either a furrow distributor or a broadcast distributor, the usual distributors designed for distributing fertilizer being suitable.

The solid diluent need only have the following essential properties. It must be a powder or powderable so that it can be admixed with or crushed with the nitroethylene, and it must be inert with respect to the nitroethylene, the soil and the plant. It can be such substances as talc, celite, kaolin, fuller's earth, pyrophyllite, diatomaceous earth, kieselguhr, hydrated lime, chalk gypsum, silica sand, or even dry soil, for example, peat muck. The diluent may also be a fertilizer such as the mixed phosphates, potassium and nitrogen fertilizers commonly incorporated in the soil rather than strewn broadcast.

The proportion of diluent to the nitroethylene may vary considerably and may be determined largely by the rate at which the nitroethylene is to be applied to the soil. Without a diluent in adequate quantity it is difficult to obtain even distribution of the chemical in the soil, especially with low concentrations, and excessive amounts of diluent increase the cost of handling. An effective balance is obtained with a composition containing about 50 per cent of the nitroethylene and about 50 per cent diluent, but the proportions may vary suitably between about 20 and 95 per cent active ingredient.

When treating large areas of soil, that is, fields, the composition may be strewn broadcast on the surface and worked in by plowing or harrowing. It should be worked in to just a few inches below the surface since it is within the first few inches of soil that the problem is most intent. The application should be made sufficiently in advance of planting in order to permit the treated soil to weather. Between two and three weeks ordinarily will be satisfactory, but a longer time may be used. When the soil is properly weathered the planting may be done without detriment to the germination of seed or to the growth of seedlings, and as previously indicated the nitroethylenes on weathering break down in the soil to yield material having nutriment value.

In many cases it is more desirable to apply the material with a furrow distributor so that only the areas in which planting is actually done is treated. If the plants are the variety that grow in hills only the area of the hill need be treated. In greenhouses the composition may be thoroly mixed with proper quantity of soil and allowed to stand with occasional light waterings to effect weathering.

The weathering of the treated soil not only effects a conversion of the nitroethylenes to a harmless state but also keeps the nematodes in condition most susceptible to control. If the soil is allowed to become too dry the nematodes have a tendency to encyst, so it is best to keep the soil moist in order to insure complete disinfection.

The amount of material required to effect control will be found to vary according to the particular circumstances, according to the extent of the infestation, the particular kind of nematode, and the manner of cultivation and application. When the material is strewn broadcast and cultivated into the soil the amount may vary according to the depth of cultivation. It is important that the compound be thoroly incorporated in the first four to six inches of the soil. If the cultivation is only to this depth as little as 200 pounds of the compound per acre may be sufficient to effect satisfactory control. With deeper cultivation more will be required. Economy in the use of the material can be effected by applying it only to the area in which plants are actually grown, for example, adjacent the rows or hills of the varieties which are grown in that manner.

The data given in the table are indicative of concentrations which are suitable. They can be read either in parts per million or pounds per half acre. Most agronomists for all thin soil treatments figure on a basis of a ratio of 1 to 2,000,000. They figure that an acre of soil to the depth of 6⅓ inches will weigh approximately 2,000,000 pounds. On this basis parts per million are equivalent to pounds per half acre. It will be understood, however, that kinds of soil and condition with respect to humus and moisture must necessarily cause considerable variation and that such variations are within the scope of the invention and determinable by those skilled in the art. Subject to the above, it ordinarily will be sufficient to apply the material in the amounts of 200 to 500 pounds per acre, though in some cases of extreme infestation more could be used, or in the greenhouse or in local applications in the proportions of 100 to 250 parts per million.

I claim:

1. The method of conditioning soil infected with nematodes which comprises incorporating in the soil a compound selected from the class consisting of 1-phenyl-2-nitroethylene and 1-alpha-furyl-2-nitroethylene in an amount sufficient to devitalize the nematodes.

2. The method of conditioning soil infected with nematodes whereby plants may be grown therein without deleterious attack which comprises incorporating in the soil a compound selected from the class consisting of 1-phenyl-2-nitroethylene and 1-alpha-furyl-2-nitroethylene in a concentration sufficient to devitalize the nematodes and exposing the treated soil to weathering prior to planting.

3. A soil disinfecting composition consisting in a finely divided, free-flowing product containing a compound selected from the class consisting of 1-phenyl-2-nitroethylene and 1-alpha-furyl-2-nitroethylene in admixture with a solid diluent.

4. A nematodacidal composition an essential active constituent of which is a compound selected from the class consisting of 1-phenyl-2-nitroethylene and 1-alpha-furyl-2-nitroethylene.

5. The method of conditioning soil infected with nematodes which comprises incorporating in the soil 1-phenyl-2-nitroethylene in an amount sufficient to devitalize the nematodes.

6. The method of conditioning soil infected with nematodes which comprises incorporating in the soil 1-alpha-furyl-2-nitroethylene in an amount sufficient to devitalize the nematodes.

7. The method of conditioning soil infected with nematodes whereby plants may be grown therein without deleterious attack which comprises incorporating in the soil 1-phenyl-2-nitroethylene in a concentration sufficient to devitalize the nematodes and exposing the treated soil to weathering prior to planting.

8. The method of conditioning soil infected with nematodes whereby plants may be grown therein without deleterious attack which comprises incorporating in the soil 1-alpha-furyl-2-nitroethylene in a concentration sufficient to devitalize the nematodes and exposing the treated soil to weathering prior to planting.

9. A soil disinfecting composition consisting in a finely divided, free-flowing product containing 1-phenyl-2-nitroethylene in admixture with a solid diluent.

10. A soil disinfecting composition consisting in a finely divided, free-flowing product containing 1-alpha-furyl-2-nitroethylene in admixture with a solid diluent.

11. A nematodacidal composition an essential active constituent of which is 1-phenyl-2-nitroethylene.

12. A nematodacidal composition an essential active constituent of which is 1-alpha-furyl-2-nitroethylene.

13. The method of conditioning soil infected with nematodes which comprises incorporating in the soil a compound selected from the class consisting of 1-phenyl-2-nitroethylene and 1-alpha-furyl-2-nitroethylene in the proportions of about 100 to 250 parts per million parts of soil.

14. The method of conditioning soil infected with nematodes which comprises incorporating in the soil 1-phenyl-2-nitroethylene in the proportions of about 100 to 250 parts per million parts of soil.

15. The method of conditioning soil infected with nematodes which comprises incorporating in the soil 1-alpha-furyl-2-nitroethylene in the proportions of about 100 to 250 parts per million parts of soil.

16. The method of conditioning soil infected with nematodes whereby plants may be grown therein without deleterious attack which comprises incorporating in the soil a compound selected from the class consisting of 1-phenyl-2-nitroethylene and 1-alpha-furyl-2-nitroethylene in a concentration of about 200 to 500 pounds per acre.

17. The method of conditioning soil infected with nematodes whereby plants may be grown therein without deleterious attack which comprises incorporating in the soil 1-phenyl-2-nitroethylene in a concentration of about 200 to 500 pounds per acre.

18. The method of conditioning soil infected with nematodes whereby plants may be grown therein without deleterious attack which comprises incorporating in the soil 1-alpha-furyl-2-nitroethylene in a concentration of about 200 to 500 pounds per acre.

WENDELL H. TISDALE.